United States Patent
Schmitz

(10) Patent No.: US 6,665,269 B1
(45) Date of Patent: Dec. 16, 2003

(54) METHOD AND APPARATUS FOR FILTERING NETWORK TRAFFIC BASED ON THE CORRECT CHANNEL IN AN IEEE 802.11(B) WIRELESS LAN

(75) Inventor: Peter O. Schmitz, Nettetal (DE)

(73) Assignee: Networks Associates Technology, Inc., Santa Clara, CA (US)

( * ) Notice: Subject to any disclaimer, the term of this patent is extended or adjusted under 35 U.S.C. 154(b) by 127 days.

(21) Appl. No.: 10/059,663

(22) Filed: Jan. 30, 2002

(51) Int. Cl.[7] ............................................. H04L 12/26
(52) U.S. Cl. ........................................................ 370/251
(58) Field of Search ................................ 370/241, 250, 370/251, 252, 310, 349, 464, 474, 475, 338; 324/612, 627, 628; 709/223, 224

(56) References Cited

U.S. PATENT DOCUMENTS

| | | |
|---|---|---|
| 6,463,271 B1 | 10/2002 | Schroeder et al. .......... 455/404 |
| 6,483,814 B1 | 11/2002 | Hsu et al. .................... 370/277 |
| 6,549,862 B1 | 4/2003 | Huang et al. ................. 702/77 |
| 2003/0012163 A1 * | 1/2003 | Cafarelli et al. ............ 370/338 |

OTHER PUBLICATIONS

Nemzow, Martin. "Implementing Wireless Networks" McGraw–Hill, Inc. Copyright 1995. p. 186.*
WildPackets. "AiroPeek Wireless Protocol Analyzer". Walnut Creek, CA. Version Sep. 13, 2001. pp. 1–4.*
Compaw ActiveAnswers. "Utilizing Compaq and Citrix MetaFrame Technologies to Provide Wireless LAN Security". ISSG Solutions Engineering. Jan. 23, 2002, pp. 1–34.*
"Sniffer Wireless Installation and Operations Guide". Sniffers Technologies Release 4.6. Feb. 16, 2001. p. 1 to 3–28.*
"AiroPeek for Windows Quick Tour," 26 pages; 1989–2001; Wild Packets, Inc.: Walnut Creek, CA 94596.

* cited by examiner

*Primary Examiner*—Chi Pham
*Assistant Examiner*—Derrick W Ferris
(74) *Attorney, Agent, or Firm*—Silicon Valley IP Group, PC; Kevin J. Zilka; Christopher J. Hamaty

(57) ABSTRACT

Data frames or packets transmitted between stations on a selected channel from amongst a plurality of channels in a wireless communication network are captured, along with data frames or packets transmitted on other of the plurality of channels that appear on the selected channel due to crosstalk caused by channel overlap, are filtered to separate the data frames or packets originated on the selected channel from these due to crosstalk, for presentation to a user in respective individual traces or screen displays.

13 Claims, 10 Drawing Sheets

CHANNEL SURFING SETTINGS  ☒

| CHANNEL ENABLE | SURF TIME (SEC) | CHANNEL ENABLE | SURF TIME (SEC) |
|---|---|---|---|
| #1 | 3 | #8 | 3 |
| #2 | 3 | #9 | 3 |
| #3 | 10 | #10 | 3 |
| #4 | 3 | #11 | 3 |
| #5 | 3 | #12 | 3 |
| #6 | 3 | #13 | 3 |
| #7 | 3 | #14 | 3 |

OK    CANCEL

FIG. 2

MAC-address: [000065453321] — 501

Channel: [8] — 502

ESS Extended Service Set, infrastructure mode [Y/N] — 503

First_seen_Frame: [0] — 504

505 — [ADD]  [MODIFY] /506  [DELETE] — 507

| MAC-address | ESS | First_seen_frame | Channel |
|---|---|---|---|
| 000012345678 | N | 191 | 5 |
| 000012345678 | N | 1032 | 8 |
| 000012456789 | Y | 231 | 5 |
| 000012676767 | Y | 195 | 6 |
| 000034123456 | Y | 565 | 6 |
| 000034123499 | Y | 0 | 5 |
| ... | ... | ... | ... |
| ... | ... | ... | ... |
| ... | ... | ... | ... |

METHOD AND APPARATUS FOR FILTERING NETWORK TRAFFIC BASED ON THE CORRECT CHANNEL IN AN IEEE 802.11(B) WIRELESS LAN

RELATED APPLICATION

This Application is related to Ser. No. 09/875,544, filed Jun. 6, 2001, for "Method and Apparatus For Filtering That Specifies The Types Of Frames To Be Captured And To Be Displayed For An IEEE 802.11 Wireless LAN;" Ser. No. 09/954,369, filed Sep. 17, 2001, for "Decoding And Detailed Analysis of Captured Frames In An IEEE 802.11 Wireless LAN;" Ser. No. 09/953,671, filed Sep. 17, 2001, for "Method And Apparatus For Capture, Analysis, And Display of Packet Information Sent In An IEEE 802.11 Wireless LAN;" and Ser. No. 10/001,779, filed Oct. 26, 2001, for "Method And Apparatus For Monitoring Different Channels In An IEEE 802.11 Wireless LAN;" the teachings of each of which are incorporated herein to the extent they do not conflict herewith. The related co-pending Applications, and the present Application have the same Assignee.

FIELD OF THE INVENTION

The present invention relates generally to computerized communication networks for permitting computers to communicate with each other in an organized manner, and more particularly to a network troubleshooting tool for detecting, and diagnosing network failures, and providing a general overview of active communications originating on each channel in the spectrum of allowed frequency channels of IEEE 802.11(b) wireless LAN (Local Area Network).

BACKGROUND OF INVENTION

Over recent years, the wireless communication field has enjoyed tremendous growth and popularity. Wireless technology now reaches or is capable of reaching nearly every place on the face of the earth. Millions of people exchange information every day using pagers, cellular telephones, and other wireless communication devices. With the success of wireless telephony and messaging services, wireless technology has also made significant inroads into the area of personal and business computing. Without the constraints imposed by wired networks, network users can move about almost everywhere without restriction and access a communication network from nearly any location, enabling wireless transmission of a variety of information types including data, video, voice and the like through the network.

Different radio technologies are used to transmit wireless information. Wireless local area networks are most often using methods described in the IEEE 802.11(b) specification. The goal is to make certain radio channels shareable for many users, but also not to cause problems by overlapping signals, which disturb other communications using other channels but the same modulation types. Presently, three technologies are most common. These are Frequency Hopping Spread Spectrum, Direct Sequence Spread Spectrum, and Orthogonal Frequency Division Multiplexing. IEEE 802.11(b) describes both technologies and their usage in Wireless LAN environments. Valid Channel Traffic Filter, as described herein, presently operates with Direct Sequence Spread Spectrum, but the general idea is adaptable to other technologies, which also use some type of channels, modulations or patterns to build several logical channels, which allow users to communicate wirelessly.

TABLE 1

DSSS Channels

| Direct | Frequency |
|---|---|
| 1 | 2.412 |
| 2 | 2.417 |
| 3 | 2.422 |
| 4 | 2.427 |
| 5 | 2.432 |
| 6 | 2.437 |
| 7 | 2.442 |
| 8 | 2.447 |
| 9 | 2.452 |
| 10 | 2.457 |
| 11 | 2.462 |
| 12 | 2.467 |
| 13 | 2.472 |
| 14 | 2.484 |

An IEEE 802.11(b) network can run in two difference modes. One is called "infrastructure mode". This is the most important one. Access points act as bridge devices between a wired network and wireless stations. The other mode is called "ad-hoc mode" and is used for peer-to-peer networking between wireless stations without an access point.

The focus of the invention is set on the infrastructure mode, but the concept will work in general. When setting up a wireless LAN infrastructure, all areas need to be covered by access point radio frequency (RF) signals. Every channel, which offers a maximum speed of 11 Mbit/sec, can only handle a certain number of clients. Each access point interface operates on a single channel. The working distance between an access point and a wireless station is limited from about 30 to 300 feet, depending upon the local environment (e.g. walls and other RF absorbing materials). Many access points are needed to fully cover an area with wireless access. Access points, which use the same frequency channel, and are close together, share the same segment and bandwidth. Neighboring channels overlap and interfere with each other, causing signals originating on one to crosstalk onto the other. There are only three totally non-overlapping channels, specifically 1, 6, and 11. Other channels can be used, if there is enough dead space in the specific local environment.

SUMMARY OF THE INVENTION

When performing network analysis in a wireless network environment, it is important to separate good and bad traffic. What are the right criteria to separate these two traffic types? In the case of an IEEE 802.11(b) wireless network, the separation is made on the IEEE 802.11(b) protocol layer which is the Data Link Layer, or even on the physical layer. In this case corrupted packets usually identify bad traffic. An error is detected for corrupted packets as a result of performing a general CRC (cyclic redundancy code) check against the CRC checksum appended to the packet. However, such error detection does not provide efficient analysis and troubleshooting in IEEE 802.11(b) wireless networks. As previously mentioned, the physical signals are not perfect. Every packet, when transmitted on one channel, will typically appear on other neighboring and overlapping channels due to crosstalk. Only channels 1, 6 and 11 are non-overlapping, thereby avoiding crosstalk therebetween. This means that a minimum of four channels between two active channels are required to provide a buffer space to avoid any overlapping and resulting crosstalk problems.

The present invention for Valid Channel Traffic Filtering enables a user to separate all of the traffic, which either belongs to a channel from which a Sniffer® Wireless is capturing data packets or frames, or which was observed on one channel, but originated on some other channel. Note that Sniffer® Wireless relates to an analyzer or monitoring tool for analyzing traffic on an IEEE 802.11(b) Wireless LAN, that is manufactured by Network Associates, Inc., Santa Clara, Calif. The user can now focus more readily on traffic associated with the channel being analyzed. Packets from overlapping radio transmissions are filtered out. This is a very important feature in case of WEP (Wired Equivalent Privacy) encrypted packet transmission. These packets are encrypted after the IEEE 802.11(b) packet header. Any useful analysis is obtained only from the limited information in the IEEE 802.11(b) header. The greater the amount of useless information that is captured, the more difficult the analysis. In environments where several wireless channels are used and channel By overlapping causes crosstalk to occur, the Valid Channel Traffic Filter of the present invention separates good and bad traffic. Analysis becomes easier and more effective because a large portion of the useless traffic is filtered out, leaving only the traffic associated with the channel of interest to analyze.

In another embodiment of the invention, the present Valid Channel Traffic Filter program permits programming a Sniffer® Wireless to capture traffic from a channel of interest, and generate two new traces for display. One trace, or 'good' trace, contains all traffic generated only on the channel of interest. The other trace, a 'bad' trace, includes all frames or traffic captured but generated on channels other than the channel of interest. As a result, a user is provided the ability to identify valid and invalid traffic captured from a channel of interest.

The present process of Valid Channel traffic filtering consists of two separate tasks. The first task analyzes all traffic to identify the correct channel for every station sending Beacon frames or Probe Response frames. A table is built, which includes the MAC (Medium Access Control) address of the radio transmitter and the correct channel number for this specific address. It will also include information indicating whether the station is an access point ESS (Extended Service Set) set to YES. The last field per record keeps the frame number, which was used to create this entry. This is important when stations change the channel during the trace capture period. A user always needs to refer to the last current channel. Therefore, it is possible to repeat some MAC addresses several times in the table, but with different channel numbers and different frame numbers, when a new channel is detected. New records will only be added, if they have updated information. Old records will not be deleted because they were valid at some time. When the network runs in infrastructure mode every access point sends Beacon frames at some constant rate. In case of a peer-to-peer network all stations generate Beacon frames in certain intervals. A Beacon frame basically announces to the entire network the capabilities of the sending station. Stations who want to join the wireless network need this information to find an access point to connect to, or an add-hoc network to join. Certain parameters broadcast in Beacon frames must match before the network can be joined. The Beacon frames also include one field, which specifies the channel on which the packet was sent. Reading all error free Beacon frames permits the system to build a table of all access points or stations, sending Beacon frames, and the channel they officially use. Probe Response frames, as a result of a Probe Request frame, also include the true channel number, which must be used for successful communication.

The second task uses this table to analyze every single frame. There are simple rules used to accomplish the analysis. Only physical error free packets will be processed. Processing frames with bit errors can result in wrong data interpretation. Every single frame has a radio transmitter and receiver MAC address. In infrastructure mode the BSSID (Basic Service Set Identification), which is the MAC address of the access point, will also be available. Every frame has an identifier in its frame header, which shows the channel on which this packet was captured. Either the BSSID or the transmitter address or the source address can be found in the table, built in the first task. The associated channel to this MAC address from the table is compared to the channel the frame was captured on. This information is stored in every frame header. If both channel numbers match, the frame is valid and gets stored in a good trace. If both channel numbers do not match, the frame was captured on another channel as it was created. This frame is invalid for the capture channel, and is moved to the bad trace. If the channels match, the frame is stored in the good trace. At the end of this process two traces are build. But two more traces can be created. One contains all packet which have physical errors, and therefore cannot be 100% correctly identified. There are ways to make an identification even if a packet has a physical error. The MAC addressees seem to be valid because the exact same MAC addresses were previously found in some good frames. In this case an error frame may be sent to the good trace. The last trace includes all unknown frames which are error free, but do not match with any entry in the Mac address table.

This was a description of some off-line Valid Channel Traffic Filter. When running this in real time, the system first needs to learn from the live network all stations which announce their dedicated channel in some frames. This is a discovery mode, and will initially only take a few seconds. It can also be an ongoing process. The user has to decide whether they want to capture only good or only bad traffic, or simply flag every frame as good or bad, based on the above mentioned rules of matching channels. A filter to focus on good or bad frames only can be applied later in the analysis process.

There are several ways to use the present filter technology. The key of this process is that the system learns about valid MAC address to channel relations by observing a very few specific frames types. Based on this knowledge the system can then decide for nearly every other frame in the trace, which does not carry current channel information in the payload, whether or not it is valid.

BRIEF DESCRIPTION OF THE DRAWINGS

Various embodiments of the present invention are described herein with reference to the drawings, in which like items are identified by the same reference designation, wherein:

FIG. 2 shows an example of a computer display of a "Channel Surfing Settings" menu;

FIG. 5 shows an example of a layout of a table and input mask associated with MAC addresses for another embodiment of the invention;

DETAILED DESCRIPTION OF THE INVENTION

Figure 1:
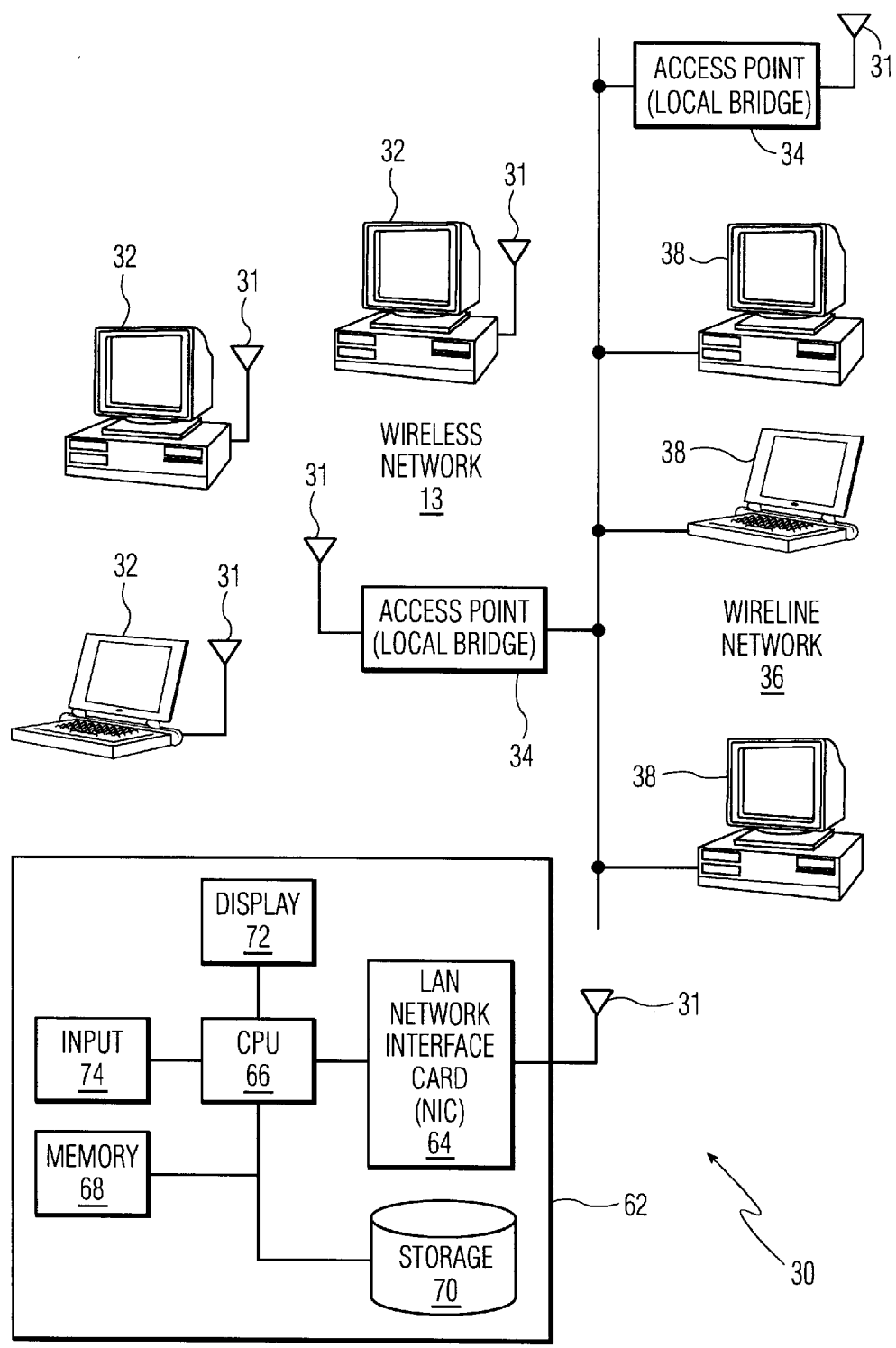
FIG. 1 shows a block schematic diagram of a computer network comprising a wire line network in communication with an IEEE802.11(b) wireless Media Local Area Network (LAN)

With reference to FIG. 1, one configuration of a LAN-based communication network 30 is shown. The network 30 comprises a plurality of wireless stations 32, and one or more wireless local bridges or access points 34 connected to a wireline network 36 of a plurality of wired stations 38. Each of the wireless stations 32 include a wireless network interface device 31 for interfacing with other wireless stations 32 and with an access point 34 to form a wireless network 33. Such a wireless network interface device, for example, is a Cisco Aironet Series 340 or Series 350 Wireless LAN Adapter, Cisco Systems, San Jose, Calif., or is a Symbol Technologies Spectrum 24 High Rate Adapter LA-4121-1020US. The wireless network interface device 31 transmits the digital signal from the wireless stations 32 to the wireless medium to enable efficient transfer between a sending station and a receiving station, typically in the form of RF signals. The access point(s) 34 enables communication between the wireless network stations 32 and the wired network stations 38, thereby expanding the associated LAN's capability. Information, control signals and other forms of digital data can be transmitted between stations 32 and 38 in the form of discrete data frames via network 30. The data frames, as one skilled in the art will recognize, are provided in a specific format commonly used in the transmission of data through the network 30.

A wireless network monitoring tool 62 of the present invention includes a wireless network interface device 31 connected to a wireless LAN network interface card (NIC) 64 for creating a connection with the LAN 30 so as to determine the topology of the LAN 30 and to monitor other network functions and data frame transmissions. The monitoring tool 62 further includes a processing unit or CPU 66 to receive information regarding the operation of the network 30. A memory 68 and a storage device 70 are connected to the processor 66 to provide temporary and permanent storage, respectively, of information required by the processor 66. A display unit 72 is connected to the processor 66 so as to display, generally in graphic form, information about the network 30 including its topology, data traffic stream, and functions and services. Through input devices 74 such as a keyboard, a mouse and the like, connected to the processor 66, and through a graphical user interface, a user can perform various analysis of the network 30 and monitor data transmissions, as will be described in detail below. The display unit 72, the input devices 74, and the graphical user interface is collectively referred to as a user interface system. The monitoring tool 62 can be considered just another station in the wireless network, similar to the workstations, printers, storage devices, servers, and so forth, but it runs in a promiscuous mode, which will enable it to receive and analyze the packets sent to other stations as well.

The graphical user interface is preferably executed on a processor 66 such as that of a Sniffer® Wireless monitoring tool 62, for example, which is capable of supporting at least one of Windows NT 4.0, Windows 98SE, or Windows 2000 Professional. However, any one of a number of commercial or proprietary processors may be used. Note that in the Sniffer® Wireless, the processor 66 requires a minimum of 128 MB (Megabytes) of RAM, 256 MB (Megabytes) of Swap Space, and 64 MB (Megabytes) of available disk drive space. The present invention may be built using available components or modules.

For the purposes of this invention, a frame represents a discrete logical unit of data transmitted through a communications network or channel from a sender station to a receiving station. The data is commonly a fragment of a much larger set of data, such as a file of text or image information. As the larger file is prepared for transmission, it is fragmented into smaller data units. Each fragment of data is packaged into a frame format, which comprises a header, payload, and trailer. The header prepends the payload and includes a set of framing bits, which are used for purposes of frame delineation and synchronization of the receiving station with the speed of transmission across the transmission link. Also included in the header are routing control information, and address information. Following the header is the payload, which contains the data unit being transmitted. Appending the payload is the trailer, which comprises data bits used for error detection and correction, and a final set of framing bits, or ending flag for purposes of frame delineation. The frame format of a frame is specific to the data communications protocol (i.e., IPX, IP, LLC, SNAP, etc.) being utilized in the network. The present invention is described in correspondence with the frame format used in IEEE802.11 LANs, although it will be understood that the present invention may also be modified for use in connection with other types of frame formats and data communications protocols.

Assume that a user has access to a known IEEE 802.11(b) analyzer, which can be programmed to provide Channel surfing embodiments of the present invention. An example of such an analyzer, such as monitoring tool 62, is a "Sniffer® Wireless" manufactured by Network Associates, Inc, Santa Clara, Calif. The Sniffer® Wireless includes a microprocessor or CPU 66 that is programmed to carry out the software routines of the invention, and a radio receiver for receiving the RF signals for each channel. In a first step the user must setup the system to operate in a desired manner. The setup is described first below. Next, the manner in which wireless traffic is received, and then forwarded to the different functional blocks of the analyzer is described.

The user defines the time the system will spend on every channel to retrieve packets. A sample screen from a Sniffer® Wireless providing monitoring tool 62 is shown in FIG. 2. More specifically, the user, such as a network manager, selects each channel desired for channel surfing, and the time the analyzer 62 is to remain on each channel for analyzing traffic flow, for example. To do this, with reference to FIG. 2, the user moves a cursor via a computer mouse to each desired channel, clicks the mouse to make the selection, and then moves the cursor to each selected channel's "Surf Time" slot, and types in the time. "OK" is addressed to secure each channel selected and each surf time selected. "Cancel" is addressed to cancel a particular setting.

Figure 3:
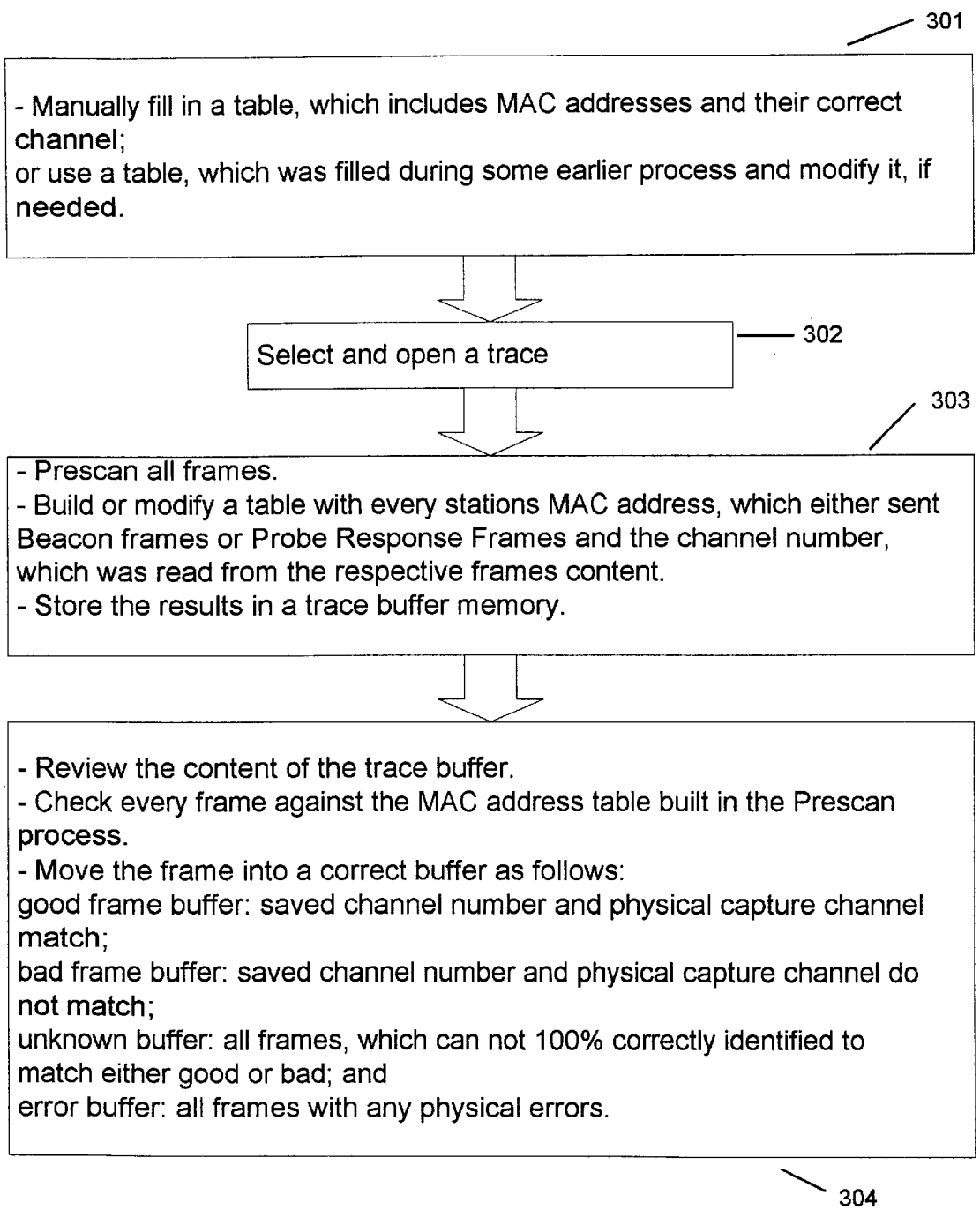
FIG. 3 shows a flowchart of an offline application which implements a Valid Channel Traffic filter as an offline module for one embodiment of the invention.

With reference to FIG. 3, in one embodiment of the invention, the first step, Step 301, provides for a user to either manually fill in a table with MAC (Medium Access Control layer) addresses of interest, or to use a previously developed table making any necessary modifications. A viewgraph or screen display of a table format for another embodiment of the invention is shown in FIG. 5. With reference to FIG. 5, if a user knows the details or structure of the wireless LAN network, Step 301 is pursued by the user entering individually into address block 501 the MAC addresses for every access point 31. Note that such Mac addresses are identical to BSSID (Basic Service Set Identification) as specified in the IEEE 802.11(b) specification. After the entry of a desired MAC address in 501, the channel number the Access Point 31 of interest is associated with must be entered in block 502. Next, in block 503 the user must indicate "Y" for yes if the infrastructure made is an Extended Service Set (ESS). If "Y", this indicates that the station or device is an Access Point 34, thereby confirming that the station is not part of an ad-hoc network mode, in which all stations have similar rights. If the user selects "N" for no in block 503, this means that the station or device is part of or in an ad-hoc network mode, and has similar priority or rights as all other stations. Also, if the user is manually entering the MAC addresses, a "0" (number zero) is entered in block 504 for setting the "First_seen_Frame:" to zero. After each new MAC address is identified, the "ADD" icon 505 is addressed for entering the address and its previously indicated related information into Table 508. If an existing MAC address in Table 508 must be modified in relation to any of its related ESS, First_seen_Frame, and Channel, the address is entered into block 501, and blocks 502, 503, and 504, respectively are filled in as previously described. Next, the "MODIFY" icon 506 is addressed to update Table 508. If an existing MAC address in Table 508 is to be deleted, the address is entered in block or field 501. Next, the "DELETE" icon 507 is addressed to remove that address, and its related information from Table 508.

Next, with further reference to FIG. 3, in Step 302 the user selects and opens a trace to run through the present Valid Channel Traffic Filter. Next, in Step 303, a Prescan process automatically runs through a trace buffer in memory 68 (see FIG. 1), and builds or increases the MAC address table 508. The Prescan Step 303 uses Beacon Frames and Probe Response Frames to determine the correct channel of certain MAC addresses. These frame types include the correct channel number, pursuant to the IEEE 802.11(b) specification. This information is stored in the same memory as the MAC address Table 508. Also, the frame number of the first frame used to make this decision is stored with Table 508. In this mode, the present Valid Channel Traffic Filter remains operative even if a station changes its channel during the time a trace was taken, since its traffic remains visible because of channel overlapping.

The last Step 304 describes the filter process itself. Every frame's 802.11 header includes decodes to identify the wireless MAC-addresses (802.11 specification). The MAC addresses are checked against the MAC address Table 508. Depending on the result and the comparison of the retrieved true channel number to the actual capture channel number, the frame can be either marked or saved in a 'good', 'bad' or 'unknown' trace files or frame buffers, respectively. Frames containing physical errors are sent to an error trace file or error frame buffer.

Figure 4:
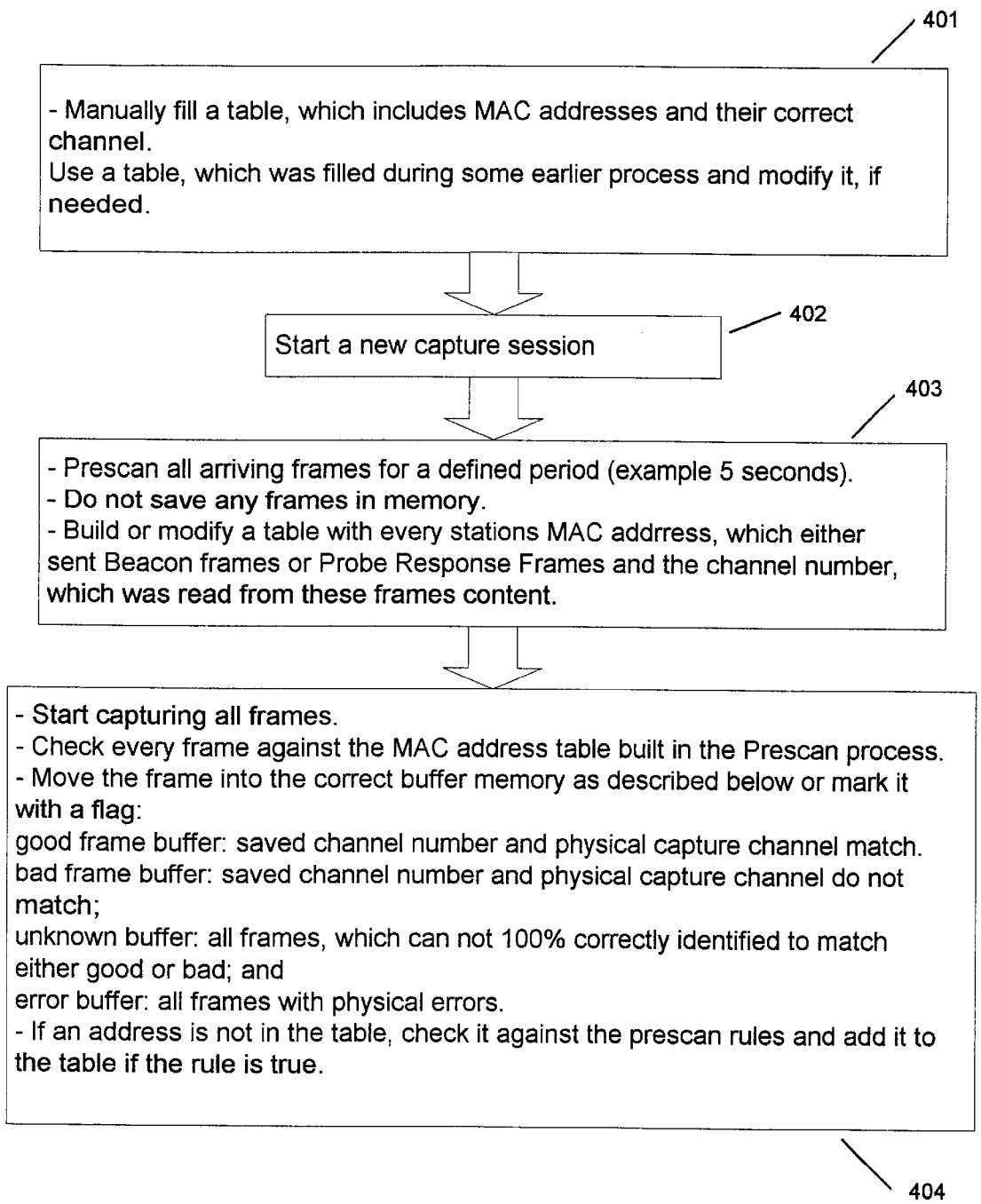
FIG. 4 shows a flowchart of an online real time application implementing a Valid Channel filter for an embodiment of the invention.

In FIG. 4 a flowchart for an embodiment of the invention for a Valid Channel Traffic Filter implemented in real time is shown. More specifically, Step 401 is identical to Step 301 of the flowchart of FIG. 3. An address table is manually filled in as previously indicated. Next, in Sept 402 the capture process is initiated, proceeding to Step 403. Within the first few seconds no frames will be captured. Each successfully captured frame is used to fill the MAC address Table 508 automatically. The pre-scan process of Step 403 is basically identical to Step 303. The only difference is that Step 303 uses the stored existing trace from previous frames, whereas in Step 403 a few seconds is spent on the live network to discover as many as possible new MAC addresses and channels, based on Beacon and Probe Response Frames. Next, the actual capture process starts in Step 404. Every captured frame is decoded to retrieve the radio or wirelessly transmitted respective MAC addresses (IEEE 802.11(b) specification). The addresses are checked against the MAC address table. Each previously stored channel is compared to the actual physical capture channel for each frame. Based on the result, the frame is either flagged as good, bad, in error or unknown. Subsequently, another offline filter can employed to separate the packets based on the flag information.

Figure 6:
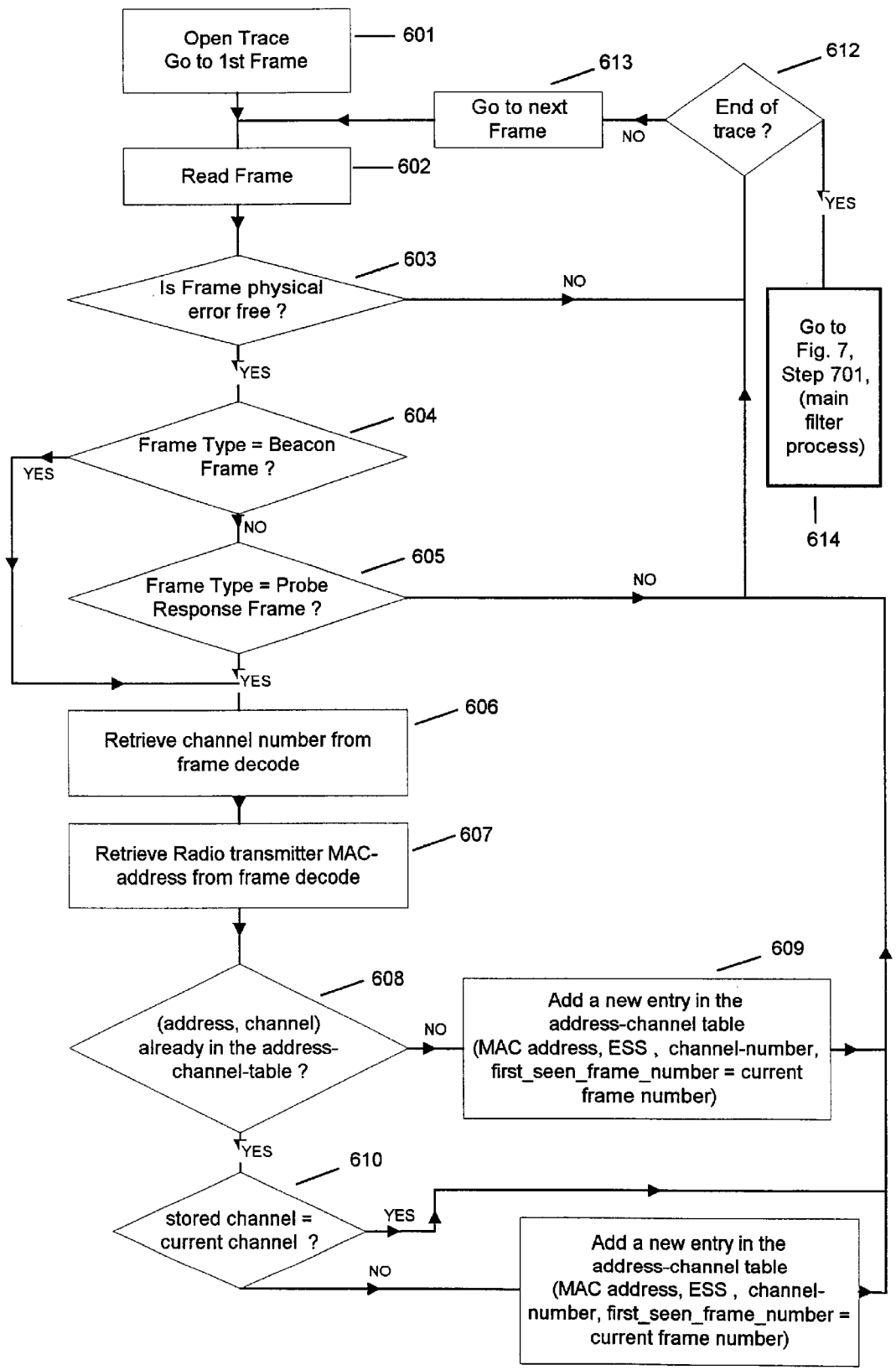
FIG. 6 shows a flowchart of an offline prescan process for an embodiment of the invention.

FIG. 6 shows a flowchart for an embodiment of the invention providing an offline Valid Channel Traffic Filter pre-scan process. More specifically, in Step 601 a selected trace is opened, and a current frame pointer is set to the first frame. The current frame is then read in Step 602. The frame is error checked in Step 603. If it is physically error free, as denoted by "Yes," the process proceeds to Step 604. If not error free, as indicated by "No," the frame is skipped, and Step 612 is entered. If the frame is error free, Step 604 determines if the current frame is a beacon frame. If "Yes," Step 606 is entered. If "No," Step 605 is entered to determine if the frame is a Probe Response Frame. If "No," the current frame cannot be used, and the process proceeds to Step 612. If the frame is either a Beacon frame or Probe response Frame, it will be decoded based on the IEEE 802.11(b) specification, via Step 606 retrieving the channel number from the frame decode, followed by Step 607 decoding and retrieving the Mac address of the wireless or radio-interface, which sent the current frame. Accordingly, a valid combination of address and transmission channel is the result of Step 606 and 607.

Next, in Step 608 the process or routine determines whether the obtained MAC-address and channel number combination is presently in the MAC address table. If "No," Step 609 is entered to add a new entry in the address-channel table. More specifically, the new entry includes the MAC address and associated channel number of the current frame. It is possible, but not likely, that the same MAC address as a prior frame, but with a different channel is observed a second time from the frame range in the buffer. Such duplicity of MAC addresses with different channels on rare occasions can occur in add-hoc networks, where stations send Beacon frames. In Infrastructure mode, the access points 34 do not change their channels without reconfiguration. An ESS flag (Extended Service Set flag) indicates whether the frame was generated by an access point 34, which is operating in infrastructure mode. In this example, the ESS flag in the decode is true ("Yes"). In add-hoc networks this flag is false ("No"). Step 610 determines if the current frame's MAC address is already in the MAC address table and the stored channel number is equal to the current channel number. If "Yes," the routine continues with Step 612. In instances where the combination of the current MAC address and the channel number are different, a new entry will be stored in the MAC address table. The values will be stored using the same rules as described in Step 609. The routine then continues processing in Step 612 to determined if the current frame is the last frame of the trace. If "Yes," linking Step 614 signals completion of the pre-scan process, whereby the routine proceeds to Step 701 (see FIG. 7) to enter the main Valid Channel Traffic Filter routine. If "No," the current frame was not the last frame, whereby Step 613 is entered to set a pointer to the next frame. The routine then proceeds to Step 602, and processing continues as previously desired.

Figure 7:
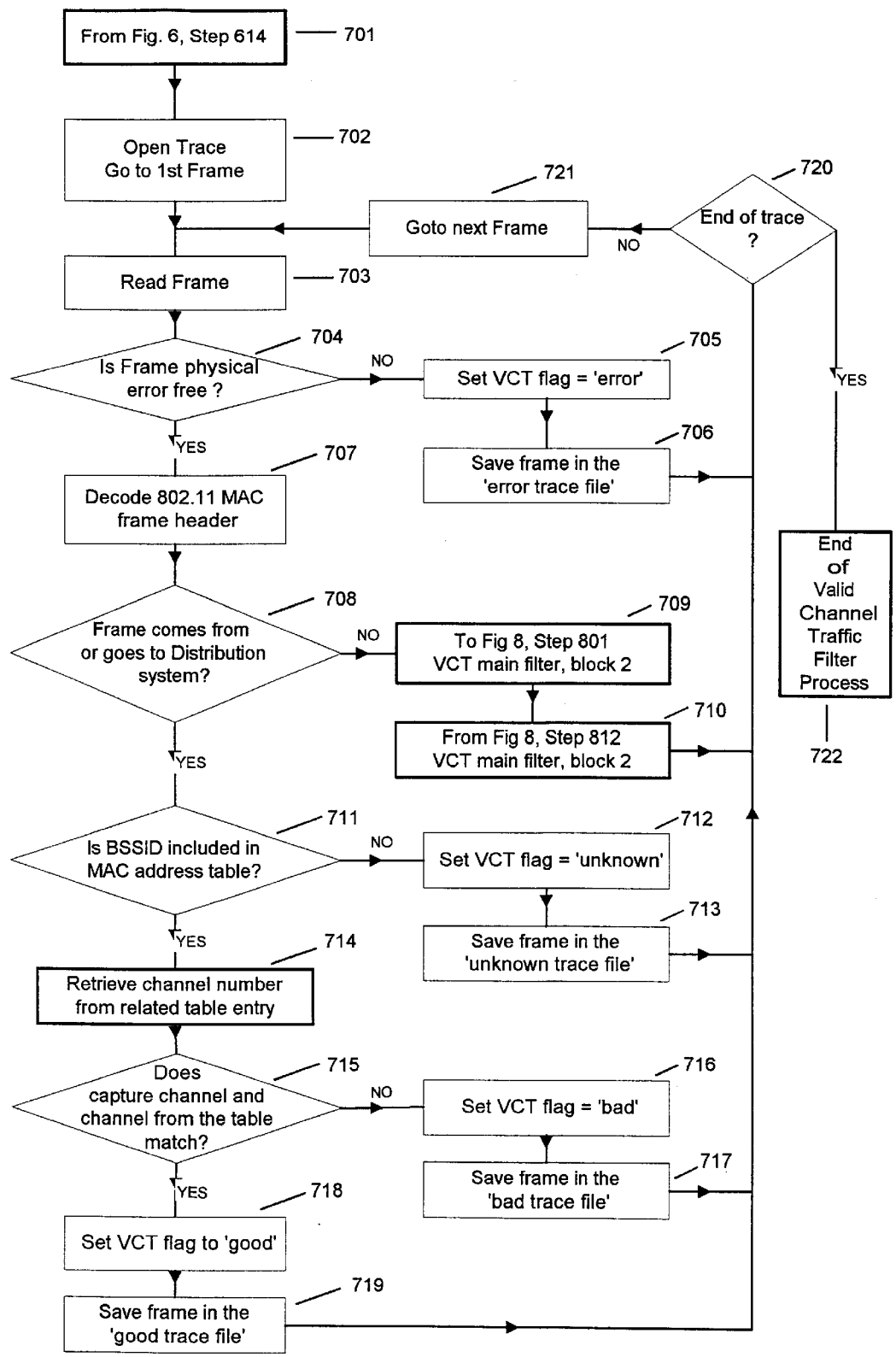
FIGS. 7 through 10 together show a flowchart for a main filtering process embodiment of the invention.
Figure 8:
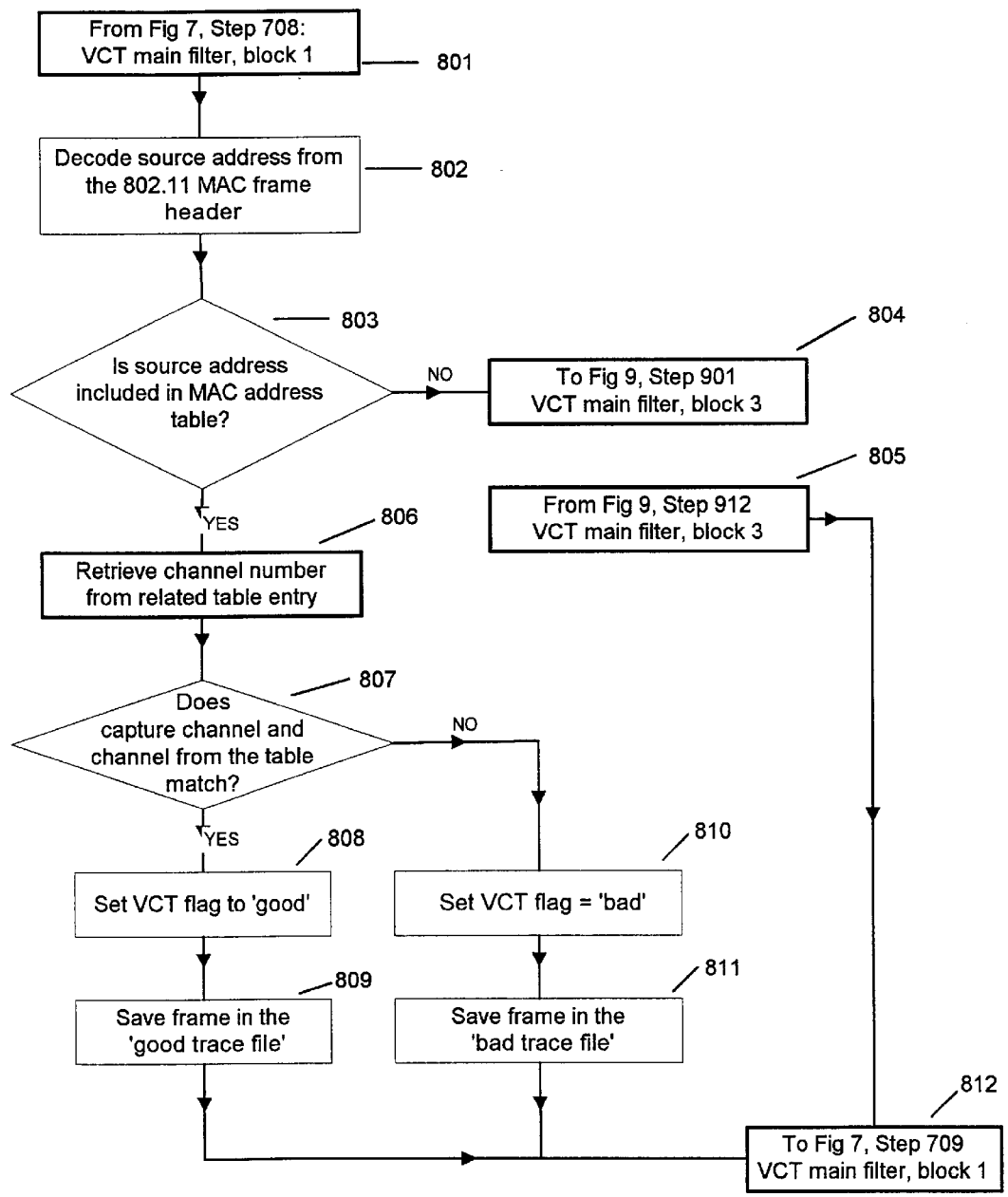
Figure 9:
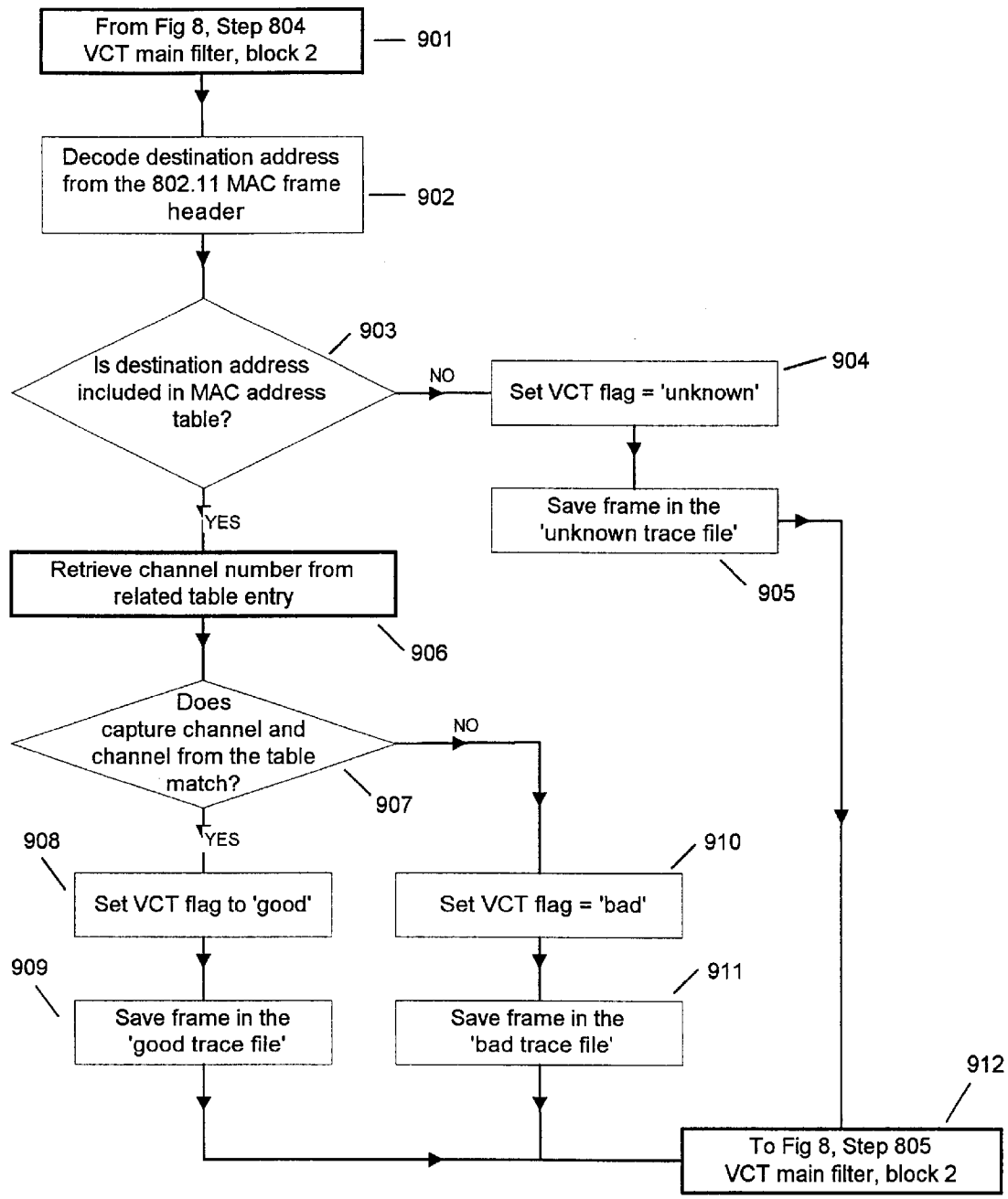
Figure 10:
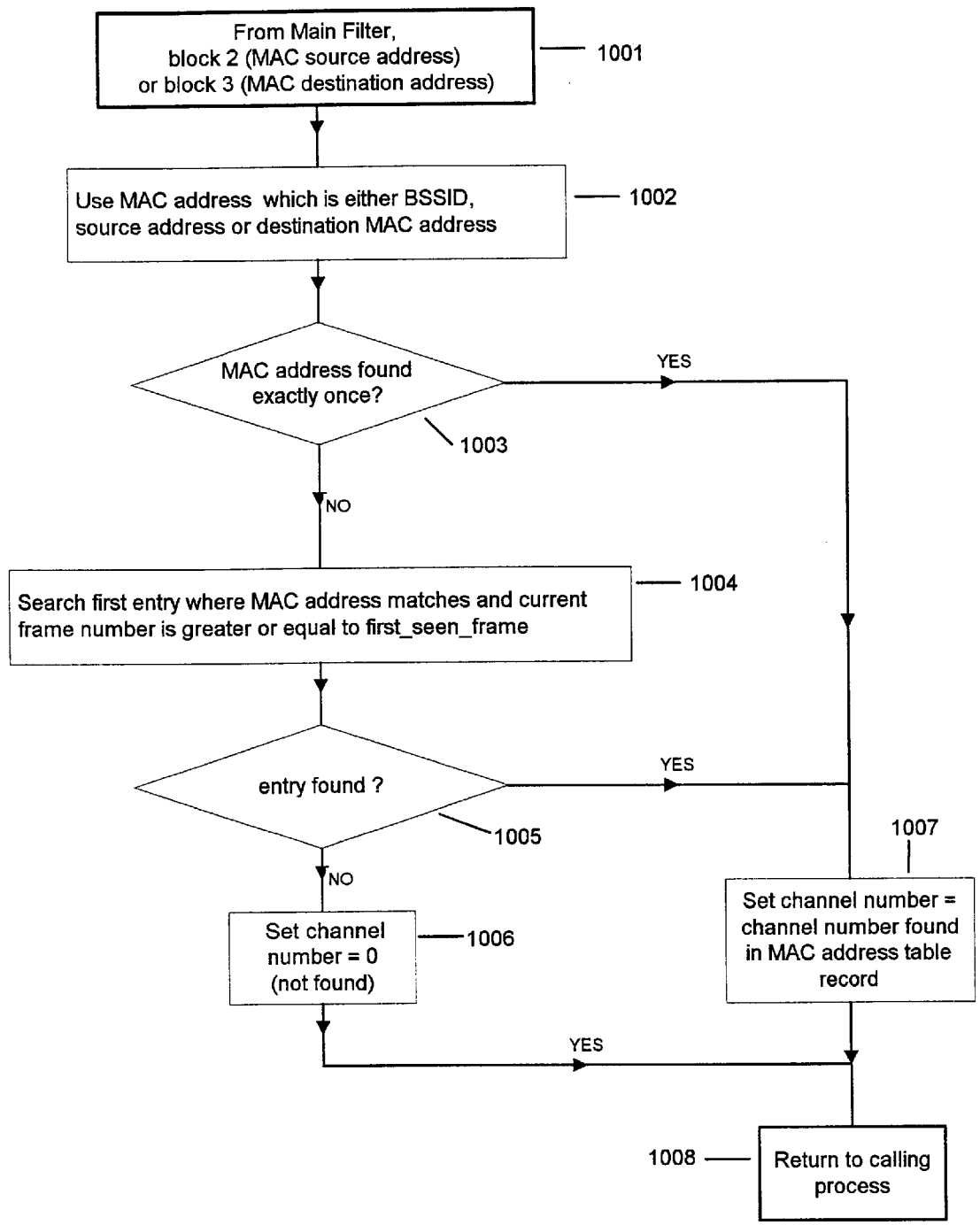

FIG. 7 shows a flowchart for a first portion of the Valid Channel Traffic filter main routine or process. FIGS. 8, 9, 10 show flowcharts for second through fourth portions included in the main routine.

Step 701 is the logical continuation from Step 614 in (FIG. 6). The trace is opened again, if it was closed between Steps. A pointer is set to the first frame in the next Step 702. The frame is read in Step (703). Next,. Step 704 determines whether this frame is error-free. If "No," the frame is not error free, and Step 705 is entered to set the VCT flag of the frame header to "error." Next, Step 706 writes the frame into the "error trace file," and the routine then continues with Step 720. If "Yes" is determined in Step 704, the frame is error free, and its IEEE 802.11(b) header is decoded in Step 707, for decoding the BSSID of the current IEEE 802.11(b) MAC frame header. To provide information for subsequent steps. Next, Step 708 determines if the frame came from or goes to a distribution system, defined as an access point 34 in the interface between the wireless and wired network. There are two one bit flags in the IEEE 802.11(b) header. If neither of the flags are set, as indicated by "No" in Step 708, the routine continues with Step 709. Step 709 links to Step 801 in FIG. 8, for continuing the routine. After processing of a combination of Steps 802–811, linking Step 812 returns processing to linking Step 710 of the routine portion of FIG. 7. Next, Step 720 determines if the last frame has been filtered. If "Yes," the filtering process or routine is terminated in Step 722.

If in Step 708 the answer is Yes, Step 711 is entered to determine if the decoded BSSID, which is the MAC address of the access point 34, is included in the MAC address table assembled during the prescan process of FIG. 6. If "No," the BSSID is not included in the table, Step 712 is entered to set the VCT flag of the frame header to "unknown." Next, Step 713 saves the frame in an "unknown trace file." If "Yes," Step 714 retrieves the channel number of the decoded current BSSID.

Next, with reference to FIG. 7, Step 715 determines by comparison whether there is a match between the returned channel and the physical channel from which the current packet was captured. The result is usually stored in the frame header. However, it is not a part of the actual packet, and serves to retain analyzer specific information per frame, such as flags, timing and the physical capture channel in the wireless environment. If "No," the channels do not match. Step 716 then sets the VCT flag in the frame header to "bad." Next, Step 717 stores the frame in a "bad trace file." The process or routine continues in step 720. If "Yes," the channels are equal or match, whereby Step 718 is entered to set the VCT flag to "good." Next, Step 719 saves the frame in a "good trace buffer." Step 720 follows to determine whether this was the last frame of the trace as previously described . If "Yes," the Valid Channel Traffic Filter offline process has been completed. As previously described, if "No" in Step 720, Step 721 is entered to move the pointer to the next frame. The loop goes on with Step 703, and the new frame is read and processed as described for the previous frame.

The present invention provides two options for processing individual frames. The frames are marked with a flag to identify the Valid Channel Traffic status. Also, the frames are stored in new trace files. The first option is real time processing as described above. The second option is to use the stored frames for offline processing of the frames as previously described for real time processing.

A trace call problem01.cap may result in four different new traces, which can be named by default as: problem01_good.cap, problem01_bad.cap, problem01_unknown.cap and problem01_error.cap. The present online Valid Channel Traffic filter process typically flags the frames for presentation issues. The routine to accomplish this is shown in the main Filter Routine portion of the flowchart of FIG. 8. Step 801 is a linking step for a continuation of linking Step 708 of FIG. 7. First, Step 802 described the wireless source-address from the IEEE 802.11(b) decode. Next, Step 803 determines whether the source address was previously included in the MAC address table, previously built in the process portion of FIG. 6. If "No," the process continues with Step 804 to link Step 901 of FIG. 9. Step 805 shows the return link from the process portion of FIG. 9. If "Yes," a match was found, whereby Step 806 is entered. Steps of the main Filter Routine portion of FIG. 8 match exactly the indicated Steps of the routine of FIG. 7, as follows:

714 matches 806

715 matches 807

718 matches 808

717 matches 811

718 matches 808

719 matches 809

Step 812 is a linking step for the return to the main process portion of FIG. 7. It is linked to link Step 709 of FIG. 7.

The flowchart portion of the main filter of FIG. 9 shows the process steps if the frame did not come from or go to a distribution system, and the MAC source address was not found in the MAC address table. Linking Step 901 is the continuation of linking Step 804 of FIG. 7. The next Step 902 receives the wireless destination address from the IEEE 802.11(b) decode. Next, Step 903 checks this address against the MAC address table, which was assembled in the process portion described in the flowchart of FIG. 6. If "No," no match was found, and Step 904 sets the VCT flag in the frame header to "unknown." Next, Step 905 saves the frame in an "unknown trace file." Lastly, Step 912 finishes this subroutine process. If "Yes" in Step 903, a match was found, and Step 906 is entered. Steps of the subroutine of FIG. 9 match exactly steps in the subroutine of FIG. 7 as follows:

714 matches 906

715 matches 907

716 matches 910

717 matches 911

718 matches 908

719 matches 909

Step 912 shows the return to the previous process, and is linked to linking Step 805 in FIG. 8.

FIG. 10 shows a flowchart for a subroutine for the channel retrieving process embodiment of the invention. Steps 714, 806, and 906 are carried out by this subroutine. Step 1001 initiates this subroutine. Next, Step 1002 uses the MAC address, which was delivered from the calling party of either Step 714, or 806, or 906. More specifically, Step 714 delivers a BSSID. The MAC address of the access point 34. Step 806 delivers the source address of the frame, and Step 906 delivers the destination address of the frame. Next, Step 1003 checks whether this MAC address is found only once in the MAC address table. If "Yes," the channel number from the table is saved in Step 1007. Next, Step 1008 returns to the calling process or routine, and delivers the channel number. If "No" in Step 1003 indicating that several entries in the MAC address table match the searched MAC address, the entry with the first_seen_frame, which is smaller or equal, but closest to the current frame number, will be used via Step 1004. This insures that the system makes a valid decision, because the identification of the correct channel was determined earlier or equal to the current frame. Some frames in the beginning of the trace may be lost. But all decisions on the correct or erroneous channel are most accurate. This only presents a problem if several records exist for one MAC address. Extended Service Set networks (the same as infrastructure mode networks) do not have access points which change their channel number. If in Step 1005, such an entry is found, Step 1007 sets the channel number. Next, Step 1008 returns processing to the calling process or routine. If Step 1005 determines no valid match was found in Step 1004, Step 1006 is entered to set the channel number to 0. Next, Step 1008 returns processing to the calling process. Since channel number 0 is not a valid channel number (1 to 14 are valid), Steps 715, 807 and 907 will result in a no match and therefore in a frame flagged as "bad."

Although various embodiments of the invention have been shown and described, they are not meant to be limiting. Those of skill in the art may make certain modifications to these embodiments, which modifications are meant to be covered by the spirit and scope of the appended claims.

What is claimed is:

1. A method for capturing data frames transmitted between stations on a selected channel of a plurality of channels in a wireless communications network, said method comprising the steps of:
   (a) establishing a direct wireless logical connection with the wireless communications network;
   (b) receiving wirelessly, in real-time, both data frames transmitted in the wireless communications network on said selected channel, and data frames originally transmitted on other ones of said plurality of channels, but appear on said selected channel due to crosstalk resulting from channel overlap; and
   (c) separating for display the data frames originally transmitted on said selected channel, from those data frames appearing on said selected channel due to crosstalk; wherein step (c) comprises the steps of:
      analyzing all data frames being transmitted over said wireless communications network to identify the correct channel for stations sending Beacon frames;
      building a table including MAC addresses and associated channel numbers of said stations transmitting said data frames, respectively, whereby associated frame numbers are used to identify each entry, respectively, in said table;
      checking for each frame captured on said selected channel its associated MAC address;
      comparing the MAC address of each frame captured on said selected channel with the corresponding MAC address in said table, to determine if the associated channel in said table to said MAC address corresponds to said selected channel;
      storing channels that match in a good trace file, for immediate or later display; and
      storing channels that do not match in a bad trace file, for immediate or later display.

2. The method of claim 1, further comprising the step of displaying to a user and/or storing in a memory storage device, the data frames originally transmitted on said selected channel.

3. The method of claim 1, further comprising the step of displaying to a user the data frames appearing on said selected channel due to crosstalk.

4. The method of claim 3, further including the step of:
   selectively displaying either as a good trace only the data frames originally transmitted on said selected channel or as a bad trace only the data frames appearing on said selected channel due to crosstalk, or simultaneously said good and bad traces.

5. The method of claim 3, wherein step (c) further includes the step of ignoring data frames containing errors.

6. The method of claim 1, wherein step (c) further includes the step of ignoring data frames containing errors.

7. The method of claim 1, wherein said analyzing step further includes the step of ignoring all data frames or packets that contain bit or physical errors.

8. The method of claim 1, further including the step of updating said table if there is a change in channel number and/or frame number for a given MAC address.

9. The method of claim 1, wherein said separating step further includes the step of selectively eliminating said data frames appearing on said selected channel due to crosstalk.

10. The method of claim 1, wherein said separating step further includes the step of selectively eliminating said data frames originally transmitted on said selected channel.

11. A method for capturing data frames transmitted between stations on a selected channel of a plurality of channels in a wireless communications network, said method comprising the steps of:
    (a) establishing a direct wireless logical connection with the wireless communications network;
    (b) receiving wirelessly, in real-time, both data frames transmitted in the wireless communications network on said selected channel, and data frames originally transmitted on other ones of said plurality of channels, but appear on said selected channel due to crosstalk resulting from channel overlap; and
    (c) separating for display the data frames originally transmitted on said selected channel, from those data frames appearing on said selected channel due to crosstalk; wherein step (c) comprises the steps of:
       analyzing all data frames being transmitted over said wireless communications network to identify the correct channel for stations sending Probe Response frames;
       building a table including MAC addresses and associated channel numbers of said stations transmitting said data frames, respectively, whereby associated frame numbers are used to identify each entry, respectively, in said table;
       checking for each frame captured on said selected channel its associated MAC address;
       comparing the MAC address of each frame captured on said selected channel with the corresponding MAC address in said table, to determine if the associated channel in said table to said MAC address corresponds to said selected channel;
       storing channels that match in a good trace file, for immediate or later display; and
       storing channels that do not match in a bad trace file, for immediate or later display.

12. The method of claim 11, wherein said analyzing step further includes the step of ignoring all data frames or packets that contain bit or physical errors.

13. The method of claim 11, further including the step of updating said table if there is a change in channel number and/or frame number for a given MAC address.

* * * * *